(12) United States Patent
Tatara et al.

(10) Patent No.: US 7,998,298 B2
(45) Date of Patent: Aug. 16, 2011

(54) CORD ALIGNING METHOD IN CALENDER LINE AND APPARATUS THEREFOR

(75) Inventors: Tetsuo Tatara, Osaka (JP); Tomoyuki Takatsuka, Osaka (JP); Hirokatsu Mizukusa, Osaka (JP); Osamu Fujiki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 798 days.

(21) Appl. No.: 11/996,037

(22) PCT Filed: Jul. 20, 2005

(86) PCT No.: PCT/JP2005/013286
§ 371 (c)(1),
(2), (4) Date: Apr. 9, 2008

(87) PCT Pub. No.: WO2007/010599
PCT Pub. Date: Jan. 25, 2007

(65) Prior Publication Data
US 2009/0249598 A1    Oct. 8, 2009

(51) Int. Cl.
*B29C 39/18* (2006.01)

(52) U.S. Cl. ........ 156/179; 156/231; 156/243; 156/298; 156/437; 156/500

(58) Field of Classification Search ............. 156/178, 156/179, 231, 298, 437, 243, 500
See application file for complete search history.

(56) References Cited

FOREIGN PATENT DOCUMENTS

| EP | 0421803 A1 * | 10/1990 |
|---|---|---|
| JP | 58-124628 | 7/1983 |
| JP | 61-113877 | 5/1986 |
| JP | 61-229515 | 10/1986 |
| JP | 06-315964 | 11/1994 |
| JP | 07-034379 | 2/1995 |
| JP | 07-34379 | 2/1995 |

* cited by examiner

*Primary Examiner* — Michael Tolin
(74) *Attorney, Agent, or Firm* — Fish & Richardson P.C.

(57) ABSTRACT

The invention is aimed at shortening time and reducing labor in a work of fitting a multiplicity of cords, respectively, into grooves of a grooved press roll and of a grooved comb roll to align the same in a calender apparatus, in which rubber is topped on the multiplicity of cords as aligned, in an aligning work, the multiplicity of cords are first fitted into grooves on an upper surface side of the comb roll to be aligned, the press roll is then displaced to an alignment transfer position from a standby position close to a topping roll to be opposed to the upper surface side of the comb roll to thereby transfer an aligned state of the cords fitted into the grooves of the comb roll to the press roll as it is to fit the respective cords into grooves of the press roll and to displace the press roll to the standby position while maintaining the fitted state, to set the cords in an aligned state.

7 Claims, 9 Drawing Sheets

CORD ALIGNING METHOD IN CALENDER LINE AND APPARATUS THEREFOR

TECHNICAL FIELD

The present invention relates to a method of aligning cords in a calender line, in which a multiplicity of cords extending in a warp direction are covered by rubber in a sheet-shaped manner in an aligned state to manufacture a topping sheet, and an apparatus therefor.

BACKGROUND ART

For example, as a tire constituent material such as carcass plies of a tire, etc. and other industrial materials, there is used a so-called topping sheet A, in which rubber R tops (covers) at least one surface (normally, both surfaces) of a reinforcement core material composed mainly of a multiplicity of fabric cords C as shown in FIGS. 10 and 11.

Conventionally, a so-called reed screen shaped woven fabric F woven by using cords C made of fabric or the like as warp and coarsely striking thin wefts W, which serve as a connection until rubber covers, every predetermined interval in a longitudinal direction, is used as a core material of such topping sheet A as shown in FIG. 12, and rubber is topped on at least one surface of the reed screen shaped woven fabric F by a calender apparatus. In the case where a topping sheet using the reed screen shaped woven fabric as core material as it is is used for a tire constituent material such as carcass plies, etc., however, the wefts in the reed screen shaped woven fabric do not serve effectively for reinforcement of a tire and there is a fear that the existence of the wefts causes failure of a tire in uniformity, failure of separation, etc. and degrades a tire performance, so that it has been proposed in recent years to remove wefts from the reed screen shaped woven fabric and to use only cords as warps in an aligned state for a core material of the topping sheet.

For example, Patent Documents 1 described later discloses a method of removing wefts from a reed screen shaped woven fabric in a process prior to a rubber coating process in order to use cords as warps of the reed screen shaped woven fabric for a core material of the topping sheet without wefts. Also, Patent Documents 2 discloses removing wefts while forwarding a reed screen shaped woven fabric pulled out of a feed section in a calender line and then passing only a multiplicity of cords being warps in an aligned state through a calender apparatus to perform topping of rubber.

By the way, a calender apparatus 150 used for topping of the rubber comprises, as shown in FIG. 13, two pairs of rolls 151a, 152a and 151b, 152b above and below a cord pass and the cords C pass in alignment between the upper and lower topping rolls 151a, 151b whereby a rubber R elongated in a thin-layered manner to be forwarded onto surfaces of the topping rolls 151a, 151b from rubber reservoirs 153a, 153b as the topping rolls 151a, 151b rotate is topped on the cords C, which pass between the both rolls, from above and under to be made generally sheet-shaped.

In case of topping the rubber R on the cords C put in alignment, in order to obtain a topping sheet of good quality, it is necessary to hold a multiplicity of cords supplied to portions of the topping rolls 151a, 151b in a state, in which they are aligned at predetermined intervals. Therefore, a grooved press roll 155, on which circumferential grooves 155a are formed at a predetermined pitch in an axial direction, is used and brought into press contact with one 151b of the topping rolls in a state, in which the respective cords C are fitted into the grooves 155a of the press roll 155.

Also, since only the grooved press roll 155 involves a fear that the cords C get out of the grooves 155a of the press roll 155 due to vibrations and swinging of the cords C being forwarded, it is normally generally used in combination with a grooved comb roll 156 formed with circumferential grooves 156a at the same pitch as that of the press roll 155 to supply the multiplicity of cords C in a manner to fit the same into both the grooves 156a of the comb roll 156 and the grooves 155a of the press roll 155 to eliminate generation of shift.

The calender apparatus 150 requires, as a preliminary work before starting operation, the work of fitting the multiplicity of cords C into the grooves 156a, 155a of both the grooved comb roll 156 and the press roll 155 to align and set the same.

The cord aligning and setting work is performed manually by a worker but the number of cords C ranges from several hundreds to several thousands (varied depending upon a width of a topping sheet being an object of manufacture), so that the work takes much labor and is one, which takes much time and labor in manually fitting the cords into the grooves of both the grooved comb roll and the press roll to align the same, Therefore, the cord aligning and setting work takes time until starting operation after an operation is stopped for set-up change of a topping sheet being an object of manufacture, change of rubber and a cord material, etc., and so an operation outage time is lengthened to lead to a decrease in producibility. In particular, an improvement in producibility is obstructed in the case where topping sheets of various kinds and small lot are manufactured.

Patent Documents 1: JP-A-61-113877
Patent Documents 2: JP-A-7-34379

DISCLOSURE OF THE INVENTION

Problems that the Invention is to Solve

The invention provides a cord aligning method and a cord aligning apparatus, which can shorten time and reduce labor required in a work of fitting a multiplicity of cords into grooves of a grooved comb roll and a grooved press roll to align and set the same, in a preliminary state before starting operation, in a calender apparatus of a calender line, in which rubber is topped while the multiplicity of cords are aligned at predetermined intervals and fed.

Means for Solving the Problems

In order to solve the problem, a cord aligning method according to the invention has a feature in that in a calender line, in which a calender apparatus performs rubber topping to manufacture a topping sheet while forwarding a multiplicity of cords in an aligned state and a press roll and a comb roll, which are provided with grooves for holding a multiplicity of cords in an aligned state, are arranged in parallel on an upstream side of a topping roll in a cord forwarding direction in the calender apparatus to fit the multiplicity of cords into grooves of both the press roll and the comb roll to hold the same in an aligned state to feed the same to a topping roll portion, the method comprises first fitting a multiplicity of cords into grooves of the comb roll on an upper surface side of the comb roll to hold the same in an aligned state in a setting work, in which the multiplicity of cords are fitted into grooves of both the press roll and the comb roll to be aligned, and then displacing the press roll from a standby position close to the topping roll to cause the same to be opposed to the upper surface side of the comb roll, whereby the aligned state of cords fitted into the grooves of the comb roll is transferred to the press roll as it is, the respective cords are fitted into the grooves of the press roll, and the press roll is displaced to the standby position while the fitted state is held.

Thereby, although two grooved rolls, that is, a grooved press roll and a grooved comb roll are used, a multiplicity of cords are fitted only into grooves of the comb roll being one of the rolls whereby the aligned state can be transferred to the press roll as it is to enable setting in an aligned state, so that it is possible to reduce labor and time required in a cord aligning and setting work by half as compared with the case where a multiplicity of cords are fitted into the grooves of the two rolls, thus enabling considerably shortening time and reducing labor.

In the cord aligning method, desirably, after the comb roll is displaced to an alignment work position set on an upstream side of the alignment transfer position in a cord forwarding direction to permit a multiplicity of cords to be fitted into the grooves of the comb roll in the alignment work position, the comb roll is returned to the alignment transfer position, and the press roll is displaced from the standby position to be opposed to the upper surface side of the comb roll. Thereby, it is possible to readily perform a work of aligning cords and fitting the cords into the grooves of the comb roll.

In the cord aligning method, preferably, when the press roll is to be displaced to the alignment transfer position from the standby position, the press roll is once caused to get out of a pass line of the cords leading to a portion of the topping roll from the comb roll to be opposed to the upper surface side of the comb roll. Thereby, even when the cords beforehand passed between the upper and lower topping rolls are fitted into the grooves of the press roll while the aligned state lacks uniformity, the press roll is once caused to get out of the pass line and interpose the cords fitted into the grooves of the comb roll to face whereby a state of being fitted into the grooves of the comb roll to be aligned is transferred to the press roll as it is, so that alignment can be surely achieved.

Preferably, a pass line changing device is provided upstream of the comb roll in the cord forwarding direction to change the pass line in the cord aligning and setting work and the pass line leading to the comb roll is lowered in the cord aligning and setting work to enable stably holding an aligned state, in which the cords are fitted into the comb roll.

A cord aligning apparatus according to the invention is an apparatus for carrying out the cord aligning method and has a feature in that in a calender line, in which a calender apparatus performs rubber topping to manufacture a topping sheet while forwarding a multiplicity of cords in an aligned state and a press roll and a comb roll, which are provided with grooves for holding a multiplicity of cords in an aligned state, are arranged in parallel on an upstream side of a topping roll in a cord forwarding direction in the calender apparatus to fit the multiplicity of cords into grooves of both the press roll and the comb roll to hold the same in an aligned state to feed the same to a topping roll portion, the press roll is supported to enable displacement between a standby position close to the topping roll and an alignment transfer position, in which it is opposed to the comb roll, on an upstream side thereof in the cord forwarding direction, and the comb roll is supported to enable displacement between the alignment transfer position to the press roll and an alignment work position on an upstream side therefrom in the cord forwarding direction and provided so that when the press roll is displaced to the alignment transfer position, it can be opposed to an upper surface side of the comb roll disposed in the alignment transfer position.

With the cord aligning apparatus, in the cord aligning and setting work, the comb roll is taken and displaced to the alignment work position to cause a multiplicity of cords to be fitted into the grooves of the comb roll to be aligned, the comb roll is returned to the alignment transfer position to the press roll while the aligned state is held, and thereafter the press roll is displaced to the alignment transfer position from the standby position to be opposed to the upper surface side of the comb roll, whereby the respective cords fitted into the grooves of the comb roll are fitted into the grooves of the press roll and thus the press roll is returned to the standby position, thus enabling transferring the state of cords aligned on the comb roll to the press roll as it is. That is, the state of cords aligned on the comb roll can be transferred to a state of cords fitted into the grooves of the press roll and aligned, only by fitting a multiplicity of cords into the grooves of the comb roll to align the same. Therefore, it is possible to favorably carry out the aligning method as a preliminary work before starting operation without problems and to considerably reduce labor required in a cord aligning and setting work, in which cords are fitted into grooves of both the grooved press roll and the grooved comb roll, which hold the cords in a state of being aligned at predetermined intervals.

Preferably, the press roll and the comb roll, respectively, are supported to enable longitudinal swinging displacement about a pivot below the roll as a fulcrum, the comb roll is provided so as to be given swinging displacement between the alignment transfer position to the press roll and the alignment work position on an upstream side therefrom in the cord forwarding direction, and the press roll is provided so as to be given swinging displacement between the standby position close to the topping roll and the alignment transfer position and provided so as to once get out of a pass line of the cords leading to a portion of the topping roll from the comb roll disposed in the alignment transfer position to be opposed to the upper surface side of the comb roll at the time of swinging displacement to the alignment transfer position.

Thereby, a state of being fitted into the grooves of the comb roll is transferred to the press roll as it is to become a state, in which the cords are fitted into the respective grooves of the press roll, thus enabling surely holding the respective cords in a state of being aligned at predetermined intervals.

When a pass line changing device is provided upstream of the comb roll in the cord forwarding direction to enable changing the pass line downward in the cord aligning and setting work, the pass line leading to the comb roll is lowered in the cord aligning and setting work to enable stably holding an aligned state, in which the cords are fitted into the grooves of the comb roll, so that the work becomes further easy to carry out.

Effect of the Invention

As described above, with the cord aligning method in a calender line and the apparatus according to the invention, in a preliminary work before starting operation or a preliminary work before starting operation after set-up change or change of a material, a multiplicity of cords can be held in the aligned state of being fitted into the grooves of the press roll only by fitting the cords in the grooves of the grooved comb roll to align the same, so that it is possible to considerably reduce labor required in a setting work, in which cords are fitted into grooves of two rolls, that is, the comb roll and the press roll, thus enabling shortening working hour and reducing labor to contribute to an improvement in producibility.

BEST MODE FOR CARRYING OUT THE INVENTION

Subsequently, a mode for carrying out the invention will be described on the basis of an embodiment shown in the drawings.

FIG. 1 is a process drawing of a calender line, in which a topping sheet A shown in FIGS. 10 and 11 and used for tire constituent members such as tire carcass plies of a tire, etc. is manufactured, in particular, a calender line, in which rubber R is topped and manufactured on at least one surface (both surfaces in the figure) of a reed screen shaped woven fabric F woven with cords C, which make core materials for reinforcement, as warps, after removal of wefts, which tie the cords C.

In the figure, the reference numeral 10 denotes a feed section of the reed screen shaped woven fabric F shown in FIG. 12, in which a multiplicity of fiber cords C are used for warps and wefts W are arranged at predetermined intervals in a longitudinal direction. The reed screen shaped woven fabric F has a width corresponding to a width of a topping sheet A being an object of manufacture and is wound in a rolled manner in a state of being subjected to heat treatment and adhesive agent treatment to be supported on a cassette type carriage 11. In the case in the figure, two carriages 11, 11 supporting the reed screen shaped woven fabric F in a rolled state are mounted in the feed section 10 and continuous pull can be achieved by joining a leading end of the reed screen shaped woven fabric F on one of the carriages 11 to a trailing end of the reed screen shaped woven fabric F on the other of the carriages 11 when the reed screen shaped woven fabric F on the latter is terminated. The reference numeral 12 denotes a joint device for the reed screen shaped woven fabric F. In case of manufacturing a topping sheet A having a relatively small width, a reed screen shaped woven fabric F cut to a necessary width from a reed screen shaped woven fabric, which is woven to a large width, and wound is used.

In the figure, the reference numeral 20 denotes a device, which pulls out a reed screen shaped woven fabric F from the feed section 10, 30 a festoon device, and a centering device 31 for the reed screen shaped woven fabric F is provided at an end of the festoon device on a forwarding side. The reference numeral 40 denotes a weft removal device for the reed screen shaped woven fabric F, provided in a manner to segment wefts contained in the reed screen shaped woven fabric F into small lengths of several cm to remove the same. The reference numeral 50 denotes a calender apparatus for topping the rubber R on a multiplicity of cords C, from which wefts are removed in the weft removal device 40 and which is fed through a dancer device 41, etc. The reference numeral 60 denotes a cooling device for a topping sheet A, which passes through the calender apparatus 50 to have rubber topped thereon and is fed through a dancer device 61, 70 a subsequent festoon device, and a centering device 71 for the topping sheet A is provided at an end of the festoon device 70 on a forwarding side. The reference numeral 80 denotes a winding device provided in a manner to wind a topping sheet A, which is centered by the centering device 71 and fed, round a winding carriage 81. In the case in the figure, two winding carriages 81, 81 are mounted longitudinally in parallel in the winding device 80 and can alternately perform winding. The reference numeral 82 denotes a winding position switching device, by which a winding position for the topping sheet A is switched over to a position every carriage and which is provided to be movable longitudinally.

As shown in enlarged scale in FIGS. 2 and 3, the calender apparatus 50 in the calender line includes two pairs of rolls 51a, 52a and 51b, 52b above and below a cord pass, and is constructed so that the rubber R pushed out and fed into rubber reservoirs 53a, 53b between the two rolls 51a, 52a and between the two rolls 51b, 52b by extruders 54a, 54b is elongated in a thin-layered manner on surfaces of the topping rolls 51a, 51b opposed to each other above and below the cord pass with a predetermined clearance therebetween to be fed as the topping rolls 51a, 51b rotate (rotate in a direction of an arrow in the figure), and the cords C pass in alignment between the topping rolls 51a, 51b whereby the thin-layered rubber R on the surfaces of the rolls is topped on the cords C from above and under to be built in a sheet-shaped manner. A clearance between the upper and lower topping rolls 51a, 51b is set according to a thickness of a topping sheet A being an object of manufacture and provided to afford adjustment.

Also, a grooved press roll 55, on which circumferential grooves 55a for holding a multiplicity of traveling cords in an aligned state are formed at a predetermined pitch in an axial direction, and a grooved comb roll 56, which is paired with the press roll 55 on an upstream side in a cord forwarding direction and on which circumferential grooves 56a are formed at a corresponding predetermined pitch in the same manner as described above, are aligned and arranged in parallel to each other upstream of the topping rolls 51a, 51b in the cord forwarding direction with the grooves 55a, 56a corresponding to each other, so that a multiplicity of cords C can be held in a state of being fitted into the grooves 55a, 56a of both the comb roll 56 and the press roll 55 and aligned to be fed to portions of the topping rolls 51a, 51b. In particular, the press roll 55 is provided to be disposed in a standby position P1 (chain line in FIG. 3) close to the lower topping roll 51b with a little spacing therebetween at the time of suspension of operation and to come into pressure contact with the surface of the topping roll 51b, in particular, the thin-layered rubber R on the roll surface as shown by a solid line in FIG. 3 at the time of operation to thereby enable feeding the respective cords C in an aligned state without generating a positional shift.

The respective grooves 55a of the press roll 55 are formed to have a groove width, which enables the respective cords C to fit thereinto and disengage therefrom without a problem as the roll rotates, and a depth, which is normally smaller than a diameter of the cords C and permits fitting of at least about ½ of the diameter, and formed at a pitch according to a cord interval on a topping sheet A being an object of manufacture. Also, the respective grooves 56a of the comb roll 56 are formed to have the same groove width, depth, and pitch as those described above.

According to the invention, the press roll 55 is not only provided to be able to come into pressure contact with the surface of the topping roll 51b from the standby position P1 close to the lower topping roll 51b with a spacing therebetween but also supported to be enabled by drive means described later to be displaced longitudinally between the standby position P1 and an alignment transfer position P2 (chain line in FIG. 3) in contact with an upper side of the comb roll 56 in a normal position upstream in the cord forwarding direction. Also, the comb roll 56 is supported to be enabled by drive means described later to be displaced longitudinally between the alignment transfer position P2 for alignment transfer to the press roll 55, which is a normal position at the time of operation, and an alignment work position P3 (chain line in FIG. 3) set upstream thereof in the cord forwarding direction.

At the time of normal suspension of operation, the press roll 55 is disposed in the standby position P1 and the comb roll 56 is disposed in the alignment transfer position P2 being a normal position, while in the preliminary work, in which cords C are newly aligned for set-up change, etc., the comb roll 56 is displaced to the alignment work position P3 to permit the respective cords C to be fitted into the respective grooves 56a of the roll to be aligned, then the comb roll is displaced to the original alignment transfer position P2, thereafter the press roll 55 is displaced to the alignment transfer position P2 from the standby position P1 to be opposed to an upper side of the comb roll 56 with the cords C therebetween and then returned to the original standby position P1 whereby the aligned state of the cords C on the comb roll 56 can be transferred to the press roll 55.

Specifically, the press roll 55 is supported through an arm 55b to enable longitudinal swinging displacement with a pivot 55c below the roll as a fulcrum, and an output shaft 57a of a cylinder device 57 as the drive means is connected to an arm portion 55d integral with the arm 55b, so that an operation of the cylinder device 57 is controlled to swing and displace the press roll to have the same operating in pressure contact with the topping roll 51b from the standby position P1 and operating to be displaced to and returned from the alignment transfer position P2. In particular, a position of the pivot 55c serving as the fulcrum is set in relation to a position of the comb roll 56 so that at the time of swinging displacement to the alignment transfer position P2 from the standby position P1, the press roll 55 once gets out of a pass line of the cords C leading to portions of the topping rolls 51a, 51b from the comb roll 56 disposed in the alignment transfer position P2 (normal position) to be opposed to an upper surface side of the comb roll 56. In addition, it is desired that the press roll 55 get slightly out of the pass line of the cords C just before being positioned on the upper surface side of the comb roll 56.

Also, the comb roll 56 is supported through an arm 56b to enable longitudinal swinging displacement with a pivot 56c below the roll as a fulcrum, and an output shaft 58a of a cylinder device 58 as the drive means is connected to an arm portion 56d integral with the arm 56b, the comb roll being set so that an operation of the cylinder device 58 is controlled to swing and displace the comb roll to have the same operating to be displaced to the alignment work position P3 from the alignment transfer position P2 and returned therefrom.

In addition, the work of fitting the cords C into the grooves on the roll outer periphery can be performed while the comb roll 56 is held in a normal position (the alignment transfer position P2) without swinging displacement but the comb roll is preferably displaced to the alignment work position as shown in order to facilitate the fitting work.

The reference numeral 59 in the figure denotes pull-out rolls for pressingly interposing, pulling out, and forwarding cords C passing between the upper and lower topping rolls 51a, 51b, or a topping sheet A formed by topping the rubber R on the cords C.

In addition, in the case in the figure, a pass line changing device 42 together with the dancer device 41 is provided upstream of the comb roll 56 in the cord forwarding direction and in the aligning and setting work, a cylinder device 42a is operated to lower a guide roller 42b whereby the pass line of the cords C leading to the comb roll 56 can be lowered downward from a normal height position (alternate long and short dash line) to be changed obliquely upward.

In the case where the calender line provided with the calender apparatus 50 is used to remove wefts for connection of cords C from a reed screen shaped woven fabric F woven with the cords C as warps and thereafter the calender apparatus 50 tops rubber R on at least one surface (both surfaces in the figure) of the fabric to manufacture a topping sheet A, the reed screen shaped woven fabric F pulled out of the feed section 10 is caused as a preliminary work before starting operation to pass through the weft removal device 40 from the festoon device 30, after the wefts are removed there, the remaining multiplicity of cords C are caused to pass below the press roll 55 from the upper side of the comb roll 56 of the calender apparatus 50 to pass between the upper and lower topping rolls 51a, 51b to be set enabling pull-out from the pull-out rolls 59 and further pulled out to a portion of the winding device 80 via the dancer device 61, the cooling device 60, and the festoon device 70.

In this state, the multiplicity of cords C, from which wefts are removed by the weft removal device 40 and which are fed to the calender apparatus 50, are fitted into the circumferential grooves 55a, 56a of both the press roll 55 and the comb roll 56 in the calender apparatus 50 in the following procedure to be set in an aligned state. The aligning and setting work will be described with reference to FIGS. 5 to 9.

In the aligning and setting work, the press roll 55 is first held in the standby position P1 as shown in FIG. 5 and the cylinder device 58 is operated to displace the comb roll 56 to the alignment work position P3. Also, at this time, the roller 42 of the pass line changing device 42 arranged upstream of the comb roll 56 is lowered to a lower position to make the pass line obliquely upward. Thus the multiplicity of cords C, respectively, are aligned in parallel so as not to generate overlapping and twist, and fitted and set one by one into the respective grooves 56a of the comb roll 56 in the alignment work position P3 on the upper surface side thereof to be aligned at predetermined intervals.

The cylinder device 58 is operated to return the comb roll 56 to the alignment transfer position P2 (normal position at the time of operation) as shown in FIG. 6, and the cylinder device 57 is operated to displace the press roll 55 to the alignment transfer position P2 from the standby position P1 as shown in FIG. 7 to oppose the same to the upper surface side of the comb roll 56 with the cords C therebetween. In particular, when the press roll 55 is displaced to the alignment transfer position P2, the press roll 55 once gets out of the pass line of the cords C leading to portions of the topping rolls 51a, 51b from the comb roll 56 disposed in the alignment transfer position P2 to be opposed to the upper surface side of the comb roll 56, whereby even when the cords C passing between the upper and lower topping rolls 51a, 51b are fitted into the grooves 55a of the press roll 55 as they are not aligned, the cords C get out of the grooves 55a to release the nonaligned state and then the press roll is opposed to the comb roll 56 with the cords C therebetween so that the cords C fitted into the grooves 56a of the comb roll 56 to be aligned are again fitted into portions of the grooves 55a of the press roll 55.

Subsequently, as shown in FIG. 8, the cylinder device 57 is operated to displace the press roll 55 to the standby position P1 while a state, in which the cords C are fitted into the grooves 55a of the press roll 55, is maintained. Consequently, the cords C fitted into the grooves 56a of the comb roll 56 are transferred to a state, in which they are fitted into the grooves 55a of the press roll 55, as they are. That is, the aligning and setting work of only fitting the cords into the grooves 56a of the comb roll 56 to align the same makes it possible to align the cords in a state of being fitted into the grooves 55a of the press roll 55, and so it is possible to reduce trouble and labor required in the aligning and setting work by half as compared with the case where a multiplicity of cords are fitted into the grooves of both the comb roll 56 and the press roll 55 to be aligned.

Thus, topping is continuously performed in the same manner as conventional by beginning the operation of the calender line and bringing the press roll 55 in the standby position P1 into pressure contact with the thin-layered rubber R on the surface of the lower topping roll 51b as shown in FIG. 9. At this time, since the press roll 55 pushes the respective cords C in an aligned state against the rubber R on the surface of the topping roll 51b, even when the press roll 55 separates, the cords reaches the cord passage between the upper and lower topping rolls 51a, 51b while being held on the rubber R in the aligned state, and the rubber R on the surface of the lower topping roll 51b and the rubber R on the surface of the upper topping roll 51a are laminated in the cord passage with the cords C therebetween to be built into a sheet, in which the cords C are embedded.

In this manner, after the weft removal device 40 removes wefts from the reed screen shaped woven fabric F pulled out of the feed section 10, only the remaining multiplicity of cords C are caused to pass between the upper and lower topping rolls 51a, 51b of the calendar apparatus 50 to be topped with the rubber R whereby a topping sheet A is continuously manufactured. The topping sheet A as manufactured is wound in the winding carriages of the winding device 80.

For the aligning and setting work at the time of set-up change of a topping sheet A being an object of manufacture, changing of rubber and a cord material, etc., it suffices to repeat the procedure in FIGS. 5 to 8 until the start of the operation to perform alignment in the same manner as described above, and it is possible to reduce labor required in the aligning and setting work and to shorten time of suspension of operation, thus enabling contributing to an improvement in producibility.

INDUSTRIAL APPLICABILITY

The invention can be preferably made use of in case of performing a setting work of fitting a multiplicity of cords into grooves of both of a grooved press roll and a grooved comb roll in a calender apparatus as a preliminary work before starting operation in a calender line, in which rubber is topped while the multiplicity of cords are held in an aligned state to be forwarded.

DESCRIPTION OF REFERENCE NUMERALS AND SIGNS

Figure 1:
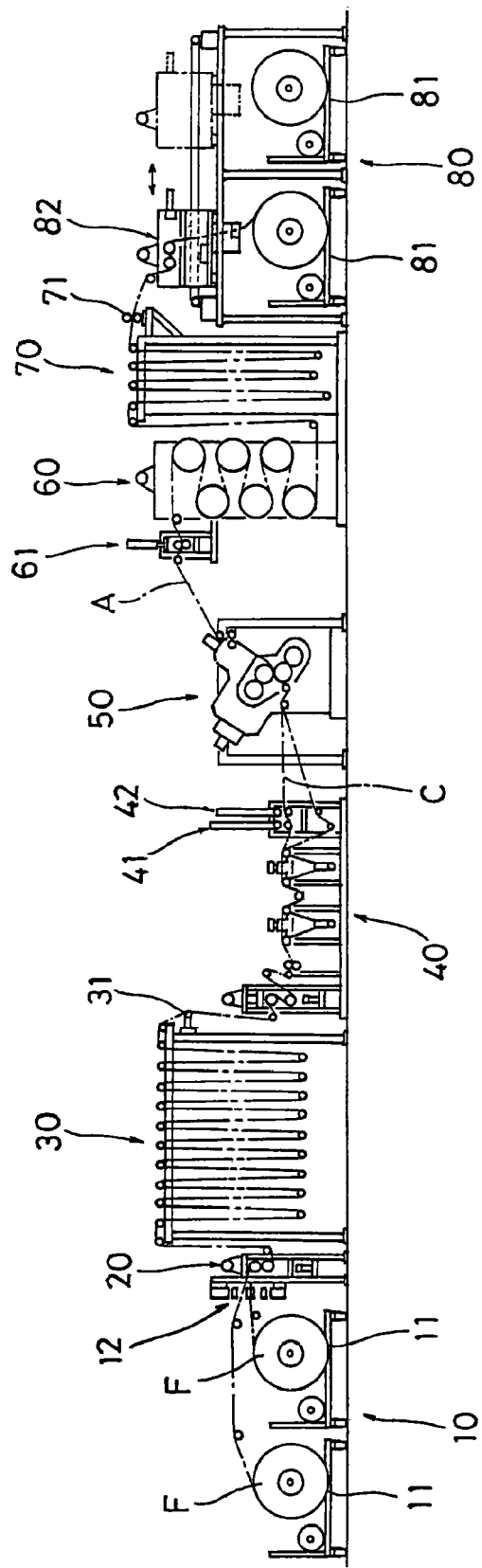
FIG. 1 is a schematic process drawing of a calender line, in which a topping sheet containing no weft is manufactured.
Figure 2:
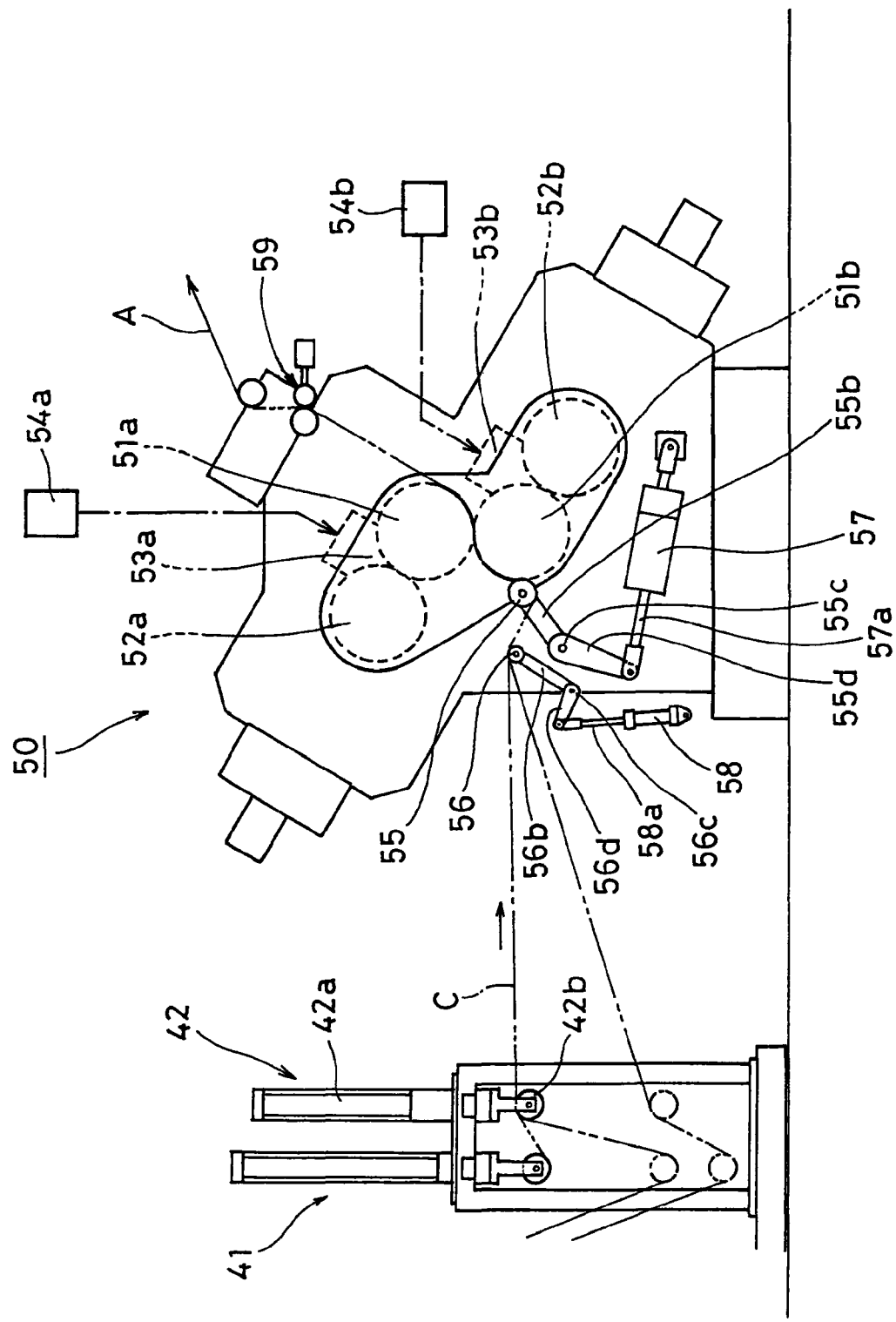
FIG. 2 is a side view showing, in enlarged scale, a portion of a calender apparatus including a cord aligning device according to the invention.
Figure 3:
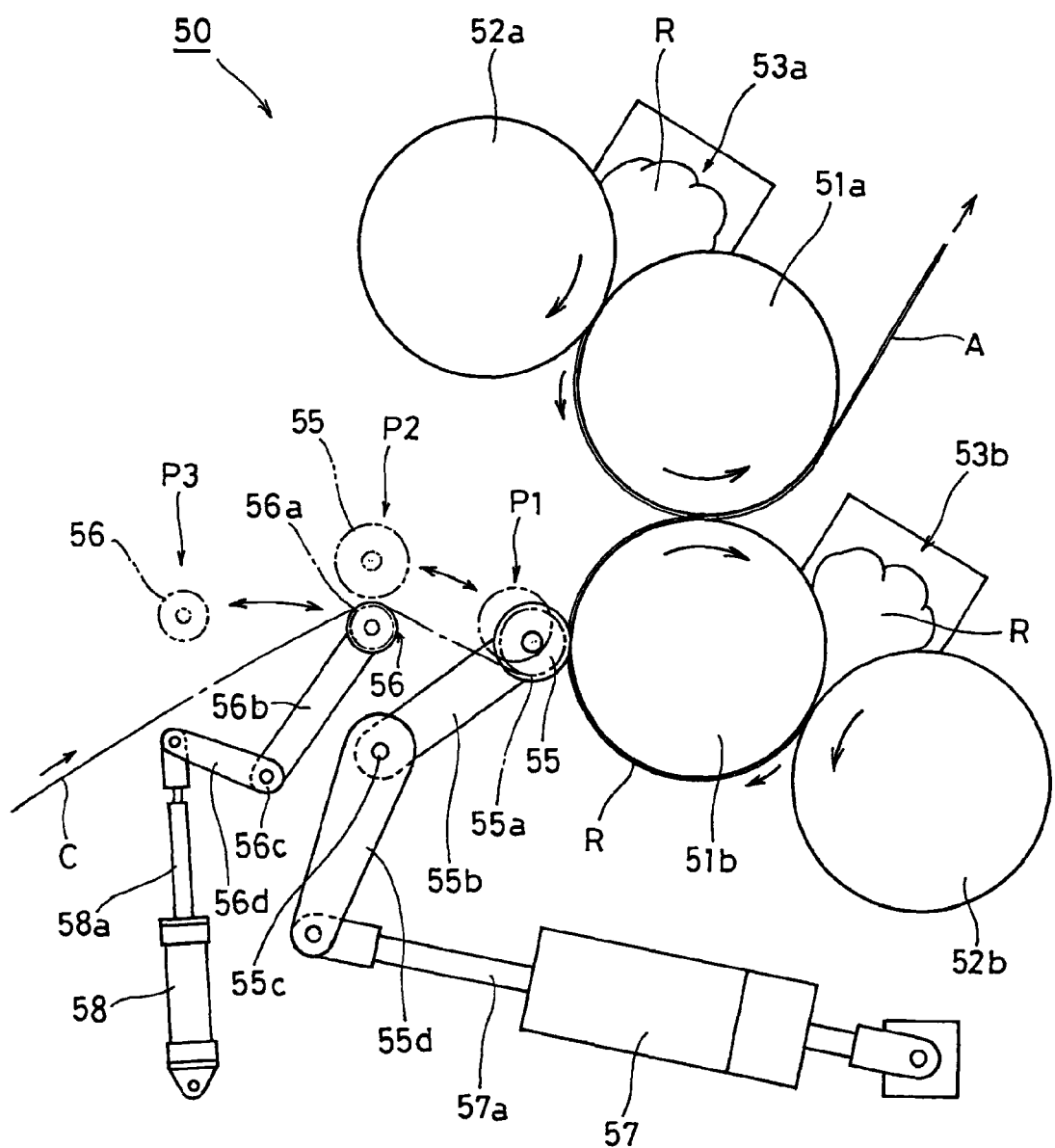
FIG. 3 is a cross sectional view showing, in enlarged scale, a portion of the calender apparatus.
Figure 4:
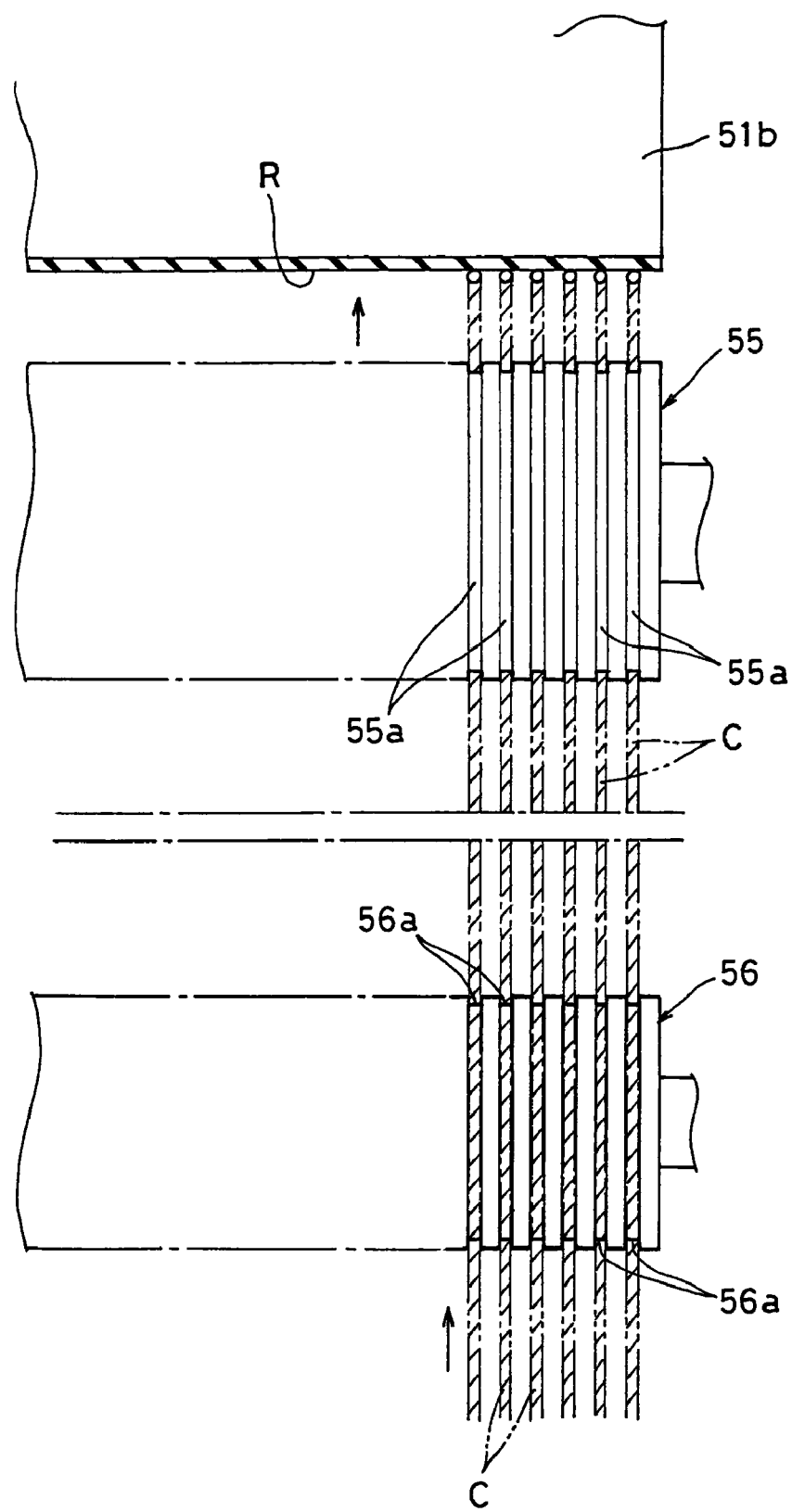
FIG. 4 is a plan view showing, in enlarged scale, portions of a press roll and a comb roll.
Figure 5:
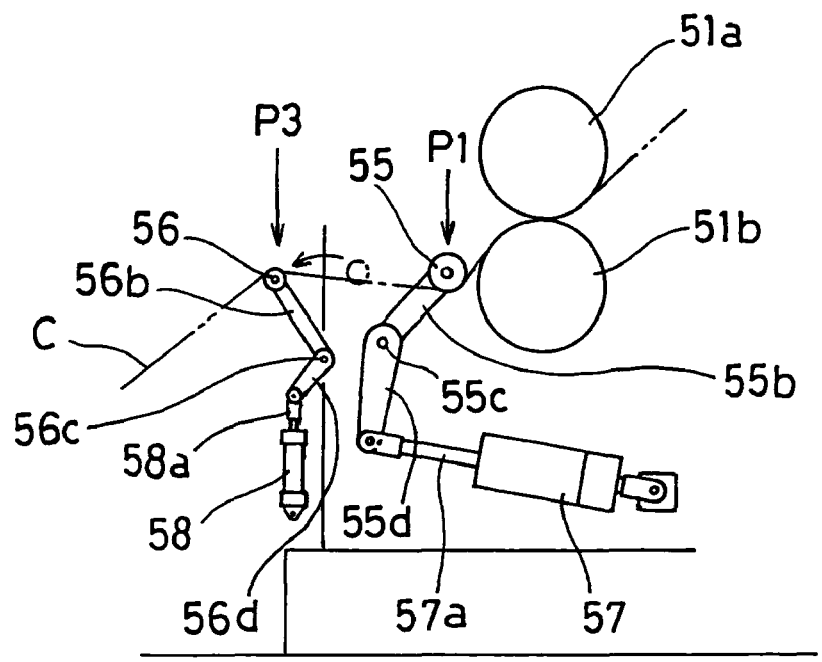
FIG. 5 is a view schematically illustrating a process in a work of aligning and setting cords.
Figure 6:
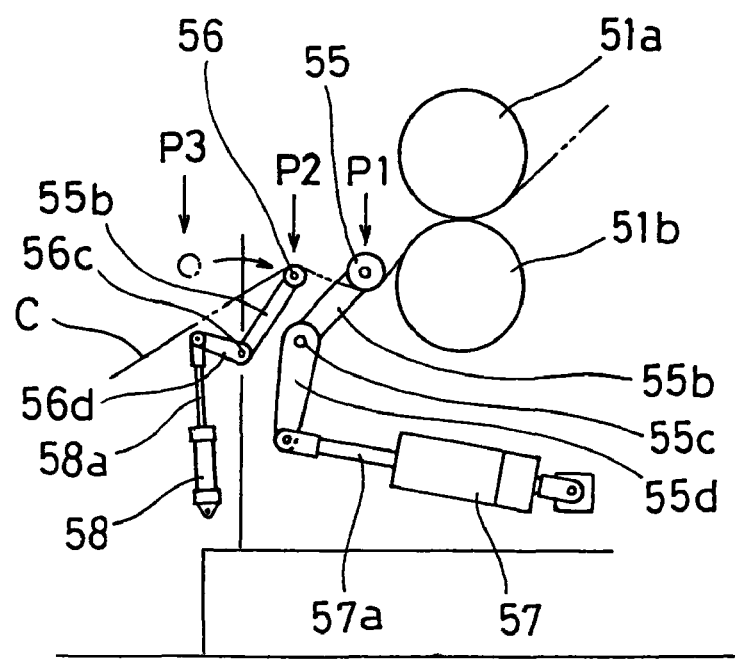
FIG. 6 is a view schematically illustrating a process in the work of aligning and setting cords.
Figure 7:
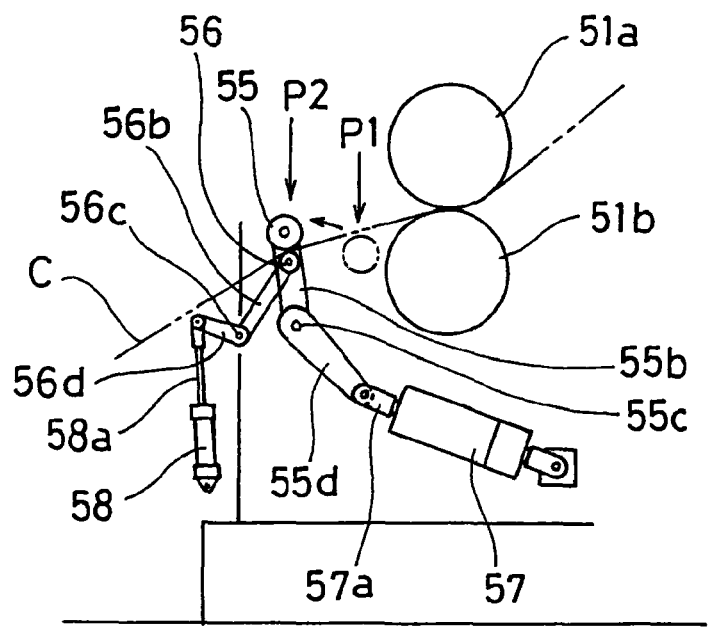
FIG. 7 is a view schematically illustrating a process in the work of aligning and setting cords.
Figure 8:
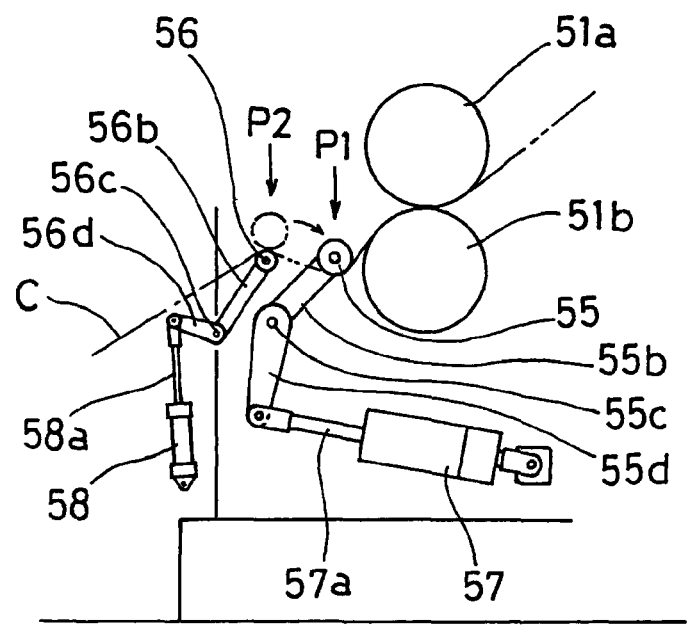
FIG. 8 is a view schematically illustrating a process in the work of aligning and setting cords.
Figure 9:
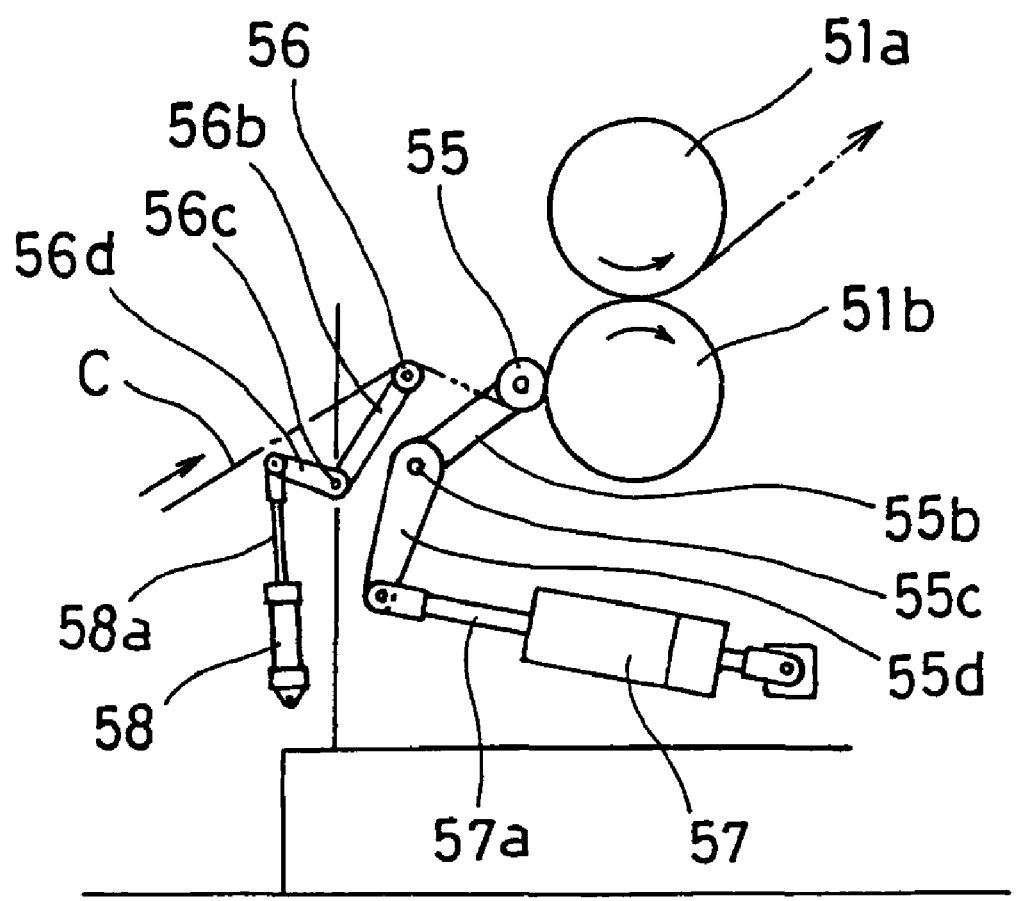
FIG. 9 is a view schematically illustrating a state in operation.
Figure 10:
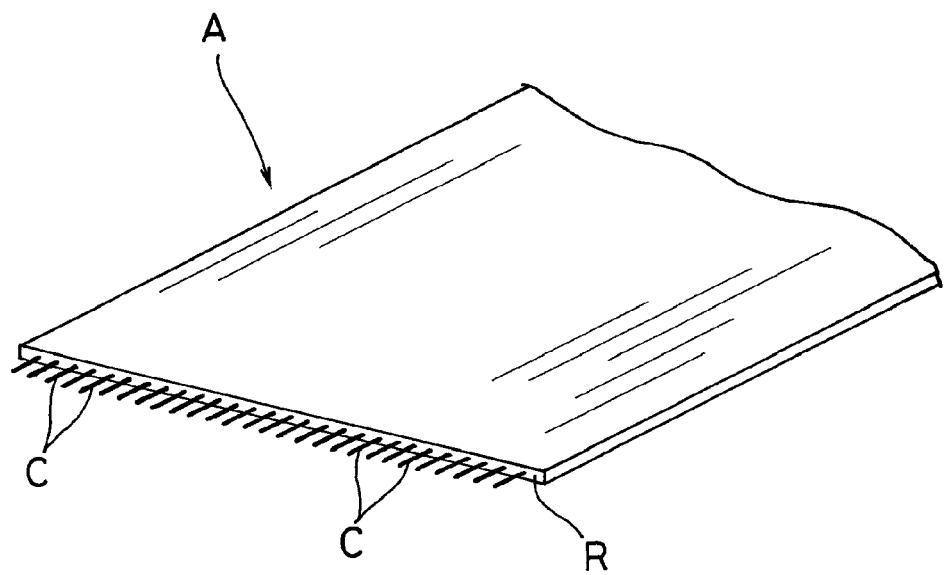
FIG. 10 is a perspective view schematically showing a topping sheet.
Figure 11:
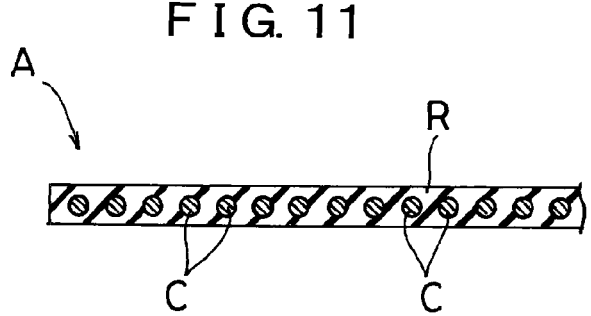
FIG. 11 is a cross sectional view showing, in enlarged scale, a portion of the topping sheet.
Figure 12:
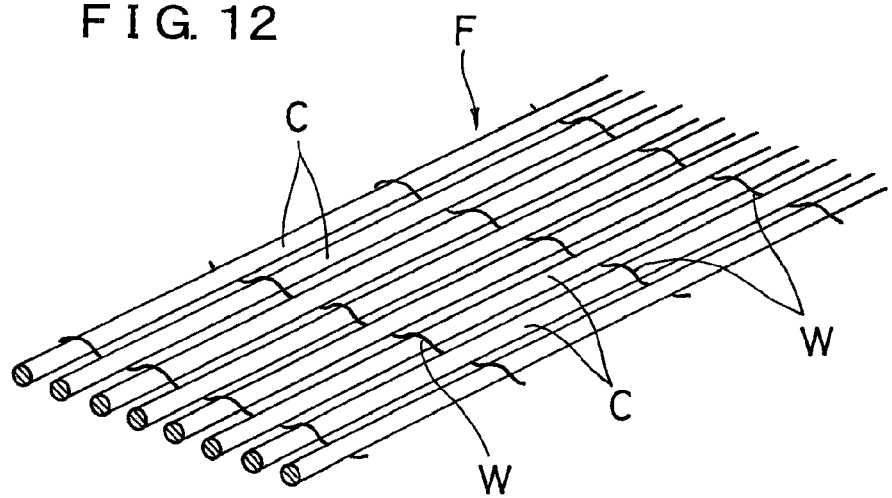
FIG. 12 is a perspective view schematically showing a reed screen shaped woven fabric.
Figure 13:
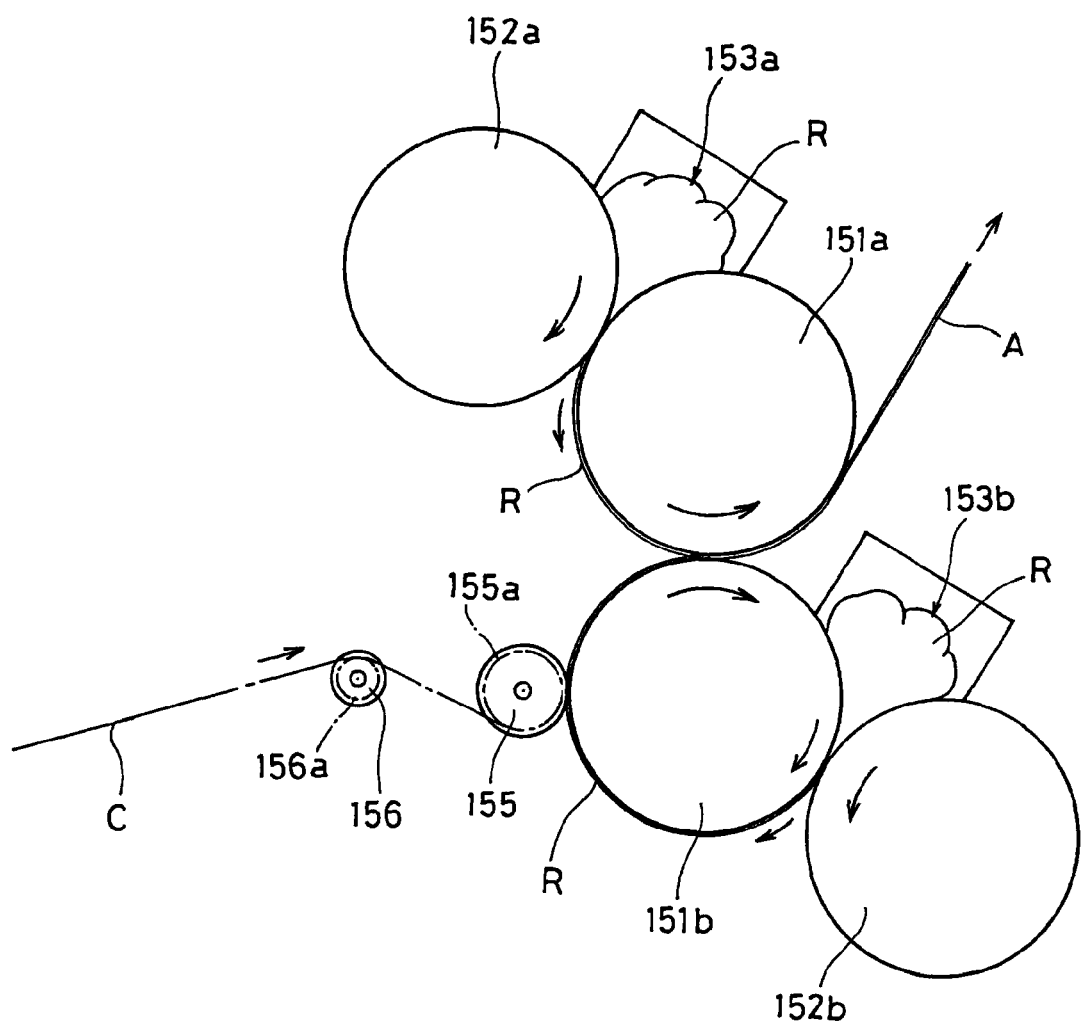
FIG. 13 is a cross sectional view schematically showing a portion of a conventional calender apparatus.

A . . . topping sheet,
C . . . cord,
F . . . reed screen shaped woven fabric,
R . . . rubber,
W . . . weft,
P1 . . . standby position,
P2 . . . alignment transfer position,
P3 . . . alignment work position,
10 . . . feed section,
11 . . . carriage,
12 . . . joint device portion,
20 . . . pull-out device,
30 . . . festoon device,
31 . . . centering device,
40 . . . weft removal device,
41 . . . dancer device,
42 . . . pass line changing device,
42a . . . cylinder device,
42b . . . guide roller,
50 . . . calender apparatus,
51a, 51b . . . upper and lower topping rolls,
52a, 52b . . . other upper and lower rolls,
53a, 53b . . . rubber reservoir,
54a, 54b . . . extruder,
55 . . . press roll,
55a . . . circumferential groove,
55b . . . arm,
55c . . . pivot,
56d . . . arm portion,
56 . . . comb roll,
56a . . . circumferential groove,
56b . . . arm,
56c . . . pivot,
56d . . . arm portion,
57, 58 . . . cylinder device,
57a, 58a . . . output shaft,
59 . . . pull-out roll,
60 . . . cooling device,
61 . . . dancer device,
70 . . . festoon device,
71 . . . centering device,
80 . . . winding device,
81 . . . winding carriage,
82 . . . winding position switching device

What is claimed is:

1. A method of aligning cords in a calender line, in which a calender apparatus performs rubber topping to manufacture a topping sheet while forwarding a multiplicity of cords in an aligned state and in which a press roll and a comb roll, both of which are provided with grooves for holding a multiplicity of cords in an aligned state, are arranged in parallel on an upstream side of a topping roll in a cord forwarding direction in the calender apparatus such that the multiplicity of cords fit into grooves of both the press roll and the comb roll to hold the same in an aligned state to feed the same to a topping roll portion, the method comprising first fitting a multiplicity of cords into grooves of the comb roll on an upper surface side of the comb roll to hold the same in an aligned state in a setting work, in which the multiplicity of cords are fitted into grooves of both the press roll and the comb roll to be aligned, and then displacing the press roll from a standby position close to the topping roll to cause the same to be opposed to the upper surface side of the comb roll, whereby the aligned state of cords fitted into the grooves of the comb roll is transferred to the press roll as it is, the respective cords are fitted into the grooves of the press roll, and the press roll is displaced to the standby position while the fitted state is held.

2. The method of aligning cords in a calender line, according to claim 1, wherein the calender line includes an alignment transfer position wherein the state of alignment of a multiplicity of cords fitted in the grooves of the comb is transferred, as such, to the press roll and an alignment work position on an upstream side of the alignment transfer position in a cord forwarding direction, and wherein when the press roll is displaced to the alignment transfer position from the standby position, the press roll is caused to get out of a pass line of the cords leading to a portion of the topping roll from the comb roll to be opposed to the upper surface side of the comb roll.

3. The method of aligning cords in a calender line, according to claim 1, wherein the calender line includes an alignment transfer position wherein the state of alignment of a multiplicity of cords fitted in the grooves of the comb is transferred, as such, to the press roll and an alignment work position on an upstream side of the alignment transfer position in a cord forwarding direction, and wherein after the comb roll is displaced to the alignment work position from the alignment transfer position to permit a multiplicity of cords to be fitted into the grooves of the comb roll in the alignment work position, the comb roll is returned to the alignment transfer position, and the press roll is displaced from the standby position to be opposed to the upper surface side of the comb roll.

4. The method of aligning cords in a calender line, according to claim 3, wherein when the press roll is displaced to the alignment transfer position from the standby position, the press roll is caused to get out of a pass line of the cords leading to a portion of the topping roll from the comb roll to be opposed to the upper surface side of the comb roll.

5. A cord aligning apparatus in a calender line, in which is performed rubber topping to manufacture a topping sheet while forwarding a multiplicity of cords in an aligned state and in which a press roll and a comb roll, both of which are provided with grooves for holding a multiplicity of cords in an aligned state, are arranged in parallel on an upstream side of a topping roll in a cord forwarding direction in the calender apparatus such that the multiplicity of cords fit into grooves of both the press roll and the comb roll to hold the same in an aligned state to feed the same to a topping roll portion, and
characterized in that the press roll is supported to enable displacement between a standby position close to the topping roll and an alignment transfer position, in which it is opposed to the comb roll, on an upstream side thereof in the cord forwarding direction, and the comb roll is supported to enable displacement between the alignment transfer position to the press roll and an alignment work position on an upstream side therefrom in the cord forwarding direction and provided so that when the press roll is displaced to the alignment transfer position, it is opposed to an upper surface side of the comb roll disposed in the alignment transfer position.

6. The cord aligning apparatus in a calender line, according to claim 5, wherein the press roll and the comb roll, respectively, are supported to enable longitudinal swinging displacement about a pivot below the roll as a fulcrum, the comb roll is provided so as to be given swinging displacement between the alignment transfer position to the press roll and the alignment work position on an upstream side therefrom in the cord forwarding direction, and the press roll is provided so as to be given swinging displacement between the standby position close to the topping roll and the alignment transfer position and provided so as to get out of a pass line of the cords leading to a portion of the topping roll from the comb roll disposed in the alignment transfer position to be opposed to the upper surface side of the comb roll at the time of swinging displacement to the alignment transfer position.

7. The cord aligning apparatus in a calender line, according to claim 5 or 6, wherein a pass line changing device is provided upstream of the comb roll in the cord forwarding direction to enable changing the pass line downward.

* * * * *